June 24, 1930. A. SARGENT 1,767,898
FISH TONGS
Filed May 24, 1926
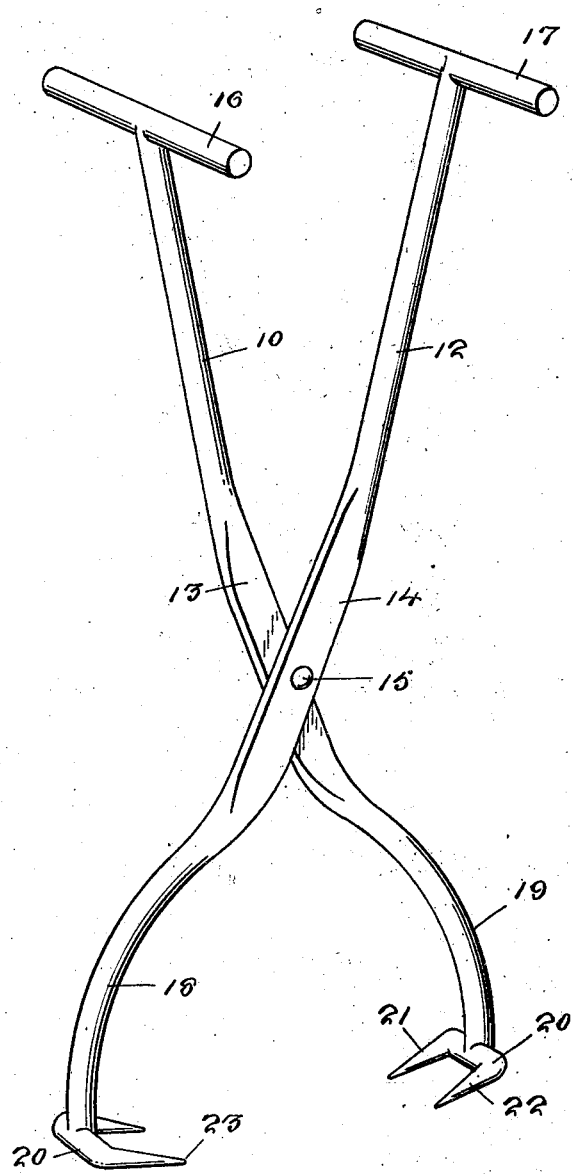
August Sargent
INVENTOR
BY Victor J. Evans
ATTORNEY
E. P. Ruppert.
WITNESS:

Patented June 24, 1930

1,767,898

UNITED STATES PATENT OFFICE

AUGUST SARGENT, OF CHALLIS, IDAHO

FISH TONGS

Application filed May 24, 1926. Serial No. 111,333.

The object of this invention is to provide a tool for use in holding fish while being cleaned.

A further object is to provide a device including a plurality of leg members pivoted at points intermediate of their ends, and carrying jaws at an abrupt angle with reference to the shank portions mounting the jaws, said elements last named being forked.

A further object is to provide, in a tool of the character indicated, a plurality of forked jaws, in which the prongs of the forks are tapered and pointed, oppositely located forks projecting toward each other.

With the foregoing and other objects in view, the invention consists in the novel construction and arrangement of elements described, illustrated and claimed, it being understood that modifications may be made within the scope of the claim, without departing from the spirit of the invention.

In the drawings forming part of this application the figure is a perspective view of the tool herein disclosed.

The leg members of the device are designated 10 and 12, and the major portion of these elements may be approximately circular in cross section, but flattened portions are provided at 13 and 14, in order that the elements 10 and 12 may be properly secured by a rivet or other retaining device 15. Handles 16 and 17 are mounted on the leg members 10 and 12, or are formed therewith.

The shank portions for the jaws are designated 18 and 19, and carried by the outer ends thereof are the jaws per se. These comprise forked or U-shaped members, each including a central portion 20 extending transversely of the ends of the shank portion by which it is mounted, and projecting from the portion 20 are prongs 21 and 22, the latter preferably being tapered, and in any event being provided with points 23. The prongs 21 and 22 may be approximately parallel, or may diverge slightly, and it will be observed that they project at an abrupt angle with reference to the ends of the shank portion, oppositely located forks projecting toward each other. Moreover the middle portions 20 of the forks extend transversely of the shank portions 18 and 19, and an especially efficient engaging and holding device is thus provided.

The prongs are of conical form as illustrated, and therefore provide a maximum degree of strength when sharpened at the points, that is, a prong which should be sharp, in order to effect the purpose intended, will be more serviceable and less liable to fracture if of the form specified. The prongs will not interlock, even if slightly deflected, because of their relative position and the proportions shown in the drawing.

It is desirable that a fish be released at once upon opening the jaws, and the separate jaws are intended to do this when the fish is of any substantial size.

Having described the invention what is claimed is:—

In a pair of fish tongs, a plurality of leg members, pivotally connected, shank portions extending beyond the pivotal point, and adapted to mount engaging devices, and jaws carried by the shank portions, said jaws projecting toward each other, and each constituting a U-shaped element, the middle portion of the U-shaped element extending transversely of the shank, said middle portions on opposite jaws being in parallel relation when the jaws are closed, and the U-shaped element including prongs of conical form and extending in approximately parallel relation and on opposite sides of each shank portion, said prongs being positioned and proportioned to approach each other in approximately similar paths, without interlocking if slightly deflected from those paths of movement, and the jaws being proportioned to jointly retain and to individually release a fish.

In testimony whereof I affix my signature.

AUGUST SARGENT.